United States Patent
Lambert et al.

(10) Patent No.: US 6,597,501 B2
(45) Date of Patent: Jul. 22, 2003

(54) PROJECTION SCREEN

(75) Inventors: Nicolaas Lambert, Eindhoven (NL); Dirk Jan Broer, Eindhoven (NL); Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/808,215

(22) Filed: Mar. 14, 2001

(65) Prior Publication Data

US 2001/0030804 A1 Oct. 18, 2001

(30) Foreign Application Priority Data

Mar. 15, 2000 (EP) .............................. 00200941

(51) Int. Cl.[7] .............................................. G03B 21/56
(52) U.S. Cl. ..................................................... 359/449
(58) Field of Search ................................ 359/443, 449, 359/453, 460, 459

(56) References Cited

U.S. PATENT DOCUMENTS

| 3,248,165 A | * | 4/1966 | Marks et al. | ............... 359/446 |
| 5,148,309 A | * | 9/1992 | Yamada et al. | ............. 359/443 |
| 5,361,163 A | * | 11/1994 | Matsuda et al. | ............ 359/459 |
| 5,400,069 A | * | 3/1995 | Braun et al. | ................ 359/460 |
| 5,940,211 A | * | 8/1999 | Hikmet et al. | ............. 359/490 |
| 6,282,023 B1 | * | 8/2001 | Bergman | .................... 359/449 |
| 6,317,263 B1 | * | 11/2001 | Moshrefzadeh et al. | .... 359/443 |
| 6,381,068 B1 | * | 4/2002 | Harada et al. | ............. 359/443 |

FOREIGN PATENT DOCUMENTS

| EP | 0648048 A1 | | 10/1944 | ............ H04N/5/74 |
| JP | 02000075284 A | * | 3/2000 | ......... G02F/1/1335 |

* cited by examiner

Primary Examiner—Christopher Mahoney

(57) ABSTRACT

A projection screen providing an improved contrast between projected light and ambient light, which projection screen includes a light-absorbing layer and an active layer located in front of said light-absorbing layer. The active layer is transparent to light having a first direction of polarization and reflective to light having a second direction of polarization. The reflecting polarizing layer may be provided between the active layer and the light-absorbing layer.

8 Claims, 4 Drawing Sheets

PROJECTION SCREEN

Figure 1:
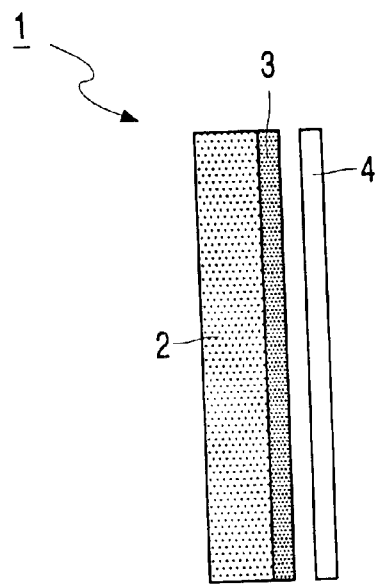

The invention relates to a projection screen having a light-absorbing layer.

In such a projection screen, which is known from European patent application EP-A2-0 421 809, a number of layers are located in front of the light-absorbing layer, each having a reflective effect for a color of light and a transparent effect for other colors of light. It is thereby envisaged to enhance the contrast between incident projected light and ambient light so that a brighter projected image is obtained.

However, the known projection screen has the drawback that it has a relatively complicated structure due to the large number of layers.

A further drawback is that the known projection screen has a great viewing angle dependence, i.e. the image quality is greatly dependent on the angle at which the screen is viewed, which may vary considerably.

It is an object of the invention to provide a projection screen in which an enhanced contrast between incident projected light and ambient light can be obtained in a simpler manner.

In the projection screen according to the invention, this object is achieved in that the projection screen is further provided with an active layer located in front of the light-absorbing layer, which active layer is transparent to light having a first direction of polarization and scatters light having a second direction of polarization.

By projecting light having a second direction of polarization on the projection screen, this light is scattered by the active layer, which is also referred to as scattering polarizer, in all directions, among which all of the directions remote from the light-absorbing layer. The daylight incident on the projection screen comprises both light having the first direction of polarization and light having the second direction of polarization. The light having the first direction of polarization is passed by the active layer and subsequently absorbed by the light-absorbing layer. The light having the second direction of polarization is scattered, similarly as the light from the projector.

An embodiment of the projection screen according to the invention is characterized in that a reflective polarizing layer is located between the light-absorbing layer and the active layer, which reflective polarizing layer is transparent to light having the first direction of polarization and reflective to light having the second direction of polarization.

The light having the second direction of polarization, scattered by the active layer towards the light-absorbing layer, is reflected by the reflective polarizing layer towards the active layer where it is again scattered, inter alia, in a direction remote from the absorbing layer.

A further embodiment of the projection screen according to the invention is characterized in that a micro-lens layer is located on a side of the active layer remote from the light-absorbing layer, the active layer being alternately provided with light-transmitting portions and scattering portions which scatter light having a second direction of polarization, while light can be directed onto the light-transmitting portions at a first angle of incidence and light can be directed on the scattering portions at a second angle of incidence by means of the micro-lens layer.

Such a projection screen is suitable if the projector is placed, for example, right opposite the projection screen, as a result of which the projected light from the projector is given a second angle of incidence. The ambient light is incident from all directions on the projection screen and thus comprises, inter alia, light directed onto the projection screen at a first angle of incidence. It will be evident that this first angle of incidence may comprise several angles deviating from the second angle of incidence. In the projection screen according to the invention, ambient light is directed at a first angle of incidence onto the light-absorbing layer via the light-transmitting portions. The light coming from the projector and having a second angle of incidence is directed onto the scattering portions by means of the lenses and scattered by these scattering portions in the same way as described hereinbefore. If desired, reflective polarizing portions may be positioned between the light-absorbing layer and the scattering portions, similarly as described hereinbefore.

These and other aspects of the invention are apparent from and will be elucidated with reference to the embodiments described hereinafter.

Figure 2:
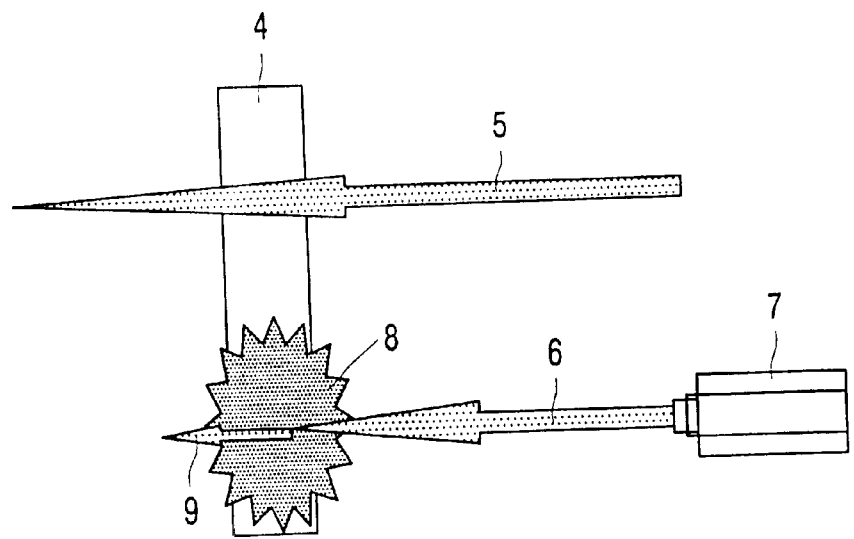

In the drawings:

FIG. 1 shows diagrammatically the structure of a projection screen according to the invention, FIG. 2 shows the operation of an active layer of the projection screen shown in FIG. 1, FIGS. 3 to 8 show embodiments of the projection screen shown in FIG. 1.

Corresponding parts in the Figures have the same reference numerals.

FIG. 1 shows diagrammatically a projection screen 1 according to the invention, provided with a light-absorbing layer 3 secured to a support 2 and an active layer 4 located in front of it.

FIG. 2 shows the operation of the active layer 4, which layer 4 consists of a polarizing layer of a scattering type as described in, for example, Japanese patent application JP-A-07333428 or U.S. Pat. No. 5,900,977.

Light having a first direction of polarization, denoted by arrow 5, is passed by the active layer 4. This light reaches the light-absorbing layer 3 (FIG. 1) where it is absorbed.

The light-absorbing layer 3 may be provided, for example, with black felt.

Light having a second direction of polarization, denoted by arrow 6 and coming from, for example, a projector 7, is scattered in all directions by the active layer 4, as is indicated by the scatter spot 8. Since the light is also scattered towards the light-absorbing layer 3, a small portion, denoted by arrow 9, will be absorbed by the absorbing layer 3. Of the ambient light, which comprises light having the first as well as the second direction of polarization, all light having the first direction of polarization is absorbed by the layer 3, whereas the light having the second direction of polarization is scattered. Consequently, the reflection of ambient light is reduced to 50%. The polarized light from the projector 7 is substantially completely reflected.

Figure 3:
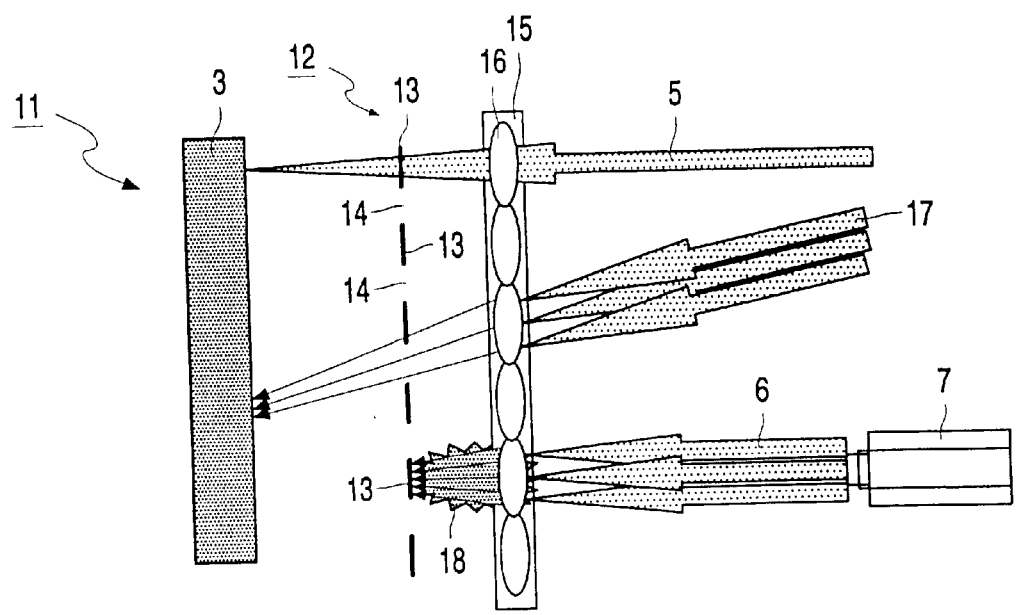

FIG. 3 shows an embodiment of a projection screen 11 according to the invention, comprising an absorbing layer 3, an active layer 12 located in front of it and having scattering portions 13 which are separated from each other by light-transmitting portions 14, and a micro-lens layer 15 located in front of the active layer 12, which micro-lens layer has a plurality of lenses 16 located opposite the scattering portions 13. The lenses 16 focus an incident light beam. The projection screen 11 operates as follows. A light beam 5 having a first direction of polarization and an angle of incidence of 90° to the absorbing layer 3 is focused by the lens 16 so that the entire beam 5 reaches an oppositely located scattering portion 13. The scattering portion 13 is, however, transparent to the first direction of polarization so that the light beam 5 passes through the scattering portion 13 and is subsequently absorbed by the absorbing layer 3. A light beam 17 having a first or a second direction of polarization and an angle of incidence of less than 90° to the absorbing layer 3 is also focused by a lens 16 but, due to the deviating angle of incidence, will at least partly pass between the scattering portions 13 through a light-transmitting portion 14 and will subsequently be absorbed by the light-absorbing layer 3.

Light having a second direction of polarization and an angle of incidence of 90° to the absorbing layer 3 is directed by the lens 16 onto a scattering portion 13 where it is scattered back towards the lens 16, as is shown by means of the scatter spot 18. In the projection screen 11, all the light having the first direction of polarization is thus absorbed, while a large part of the light having the second direction of polarization and a different angle of incidence than the light from the projector 7 will also be absorbed. In this way, the projection screen 11 only reflects a relatively small part of the ambient light.

Figure 4:
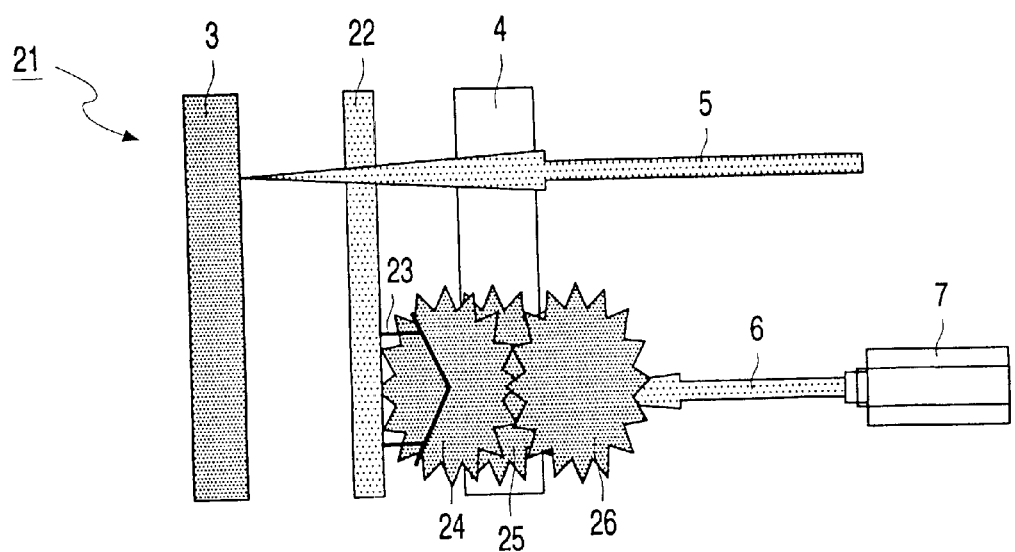

FIG. 4 shows a second embodiment of a projection screen 21 according to the invention, provided with a reflecting polarization layer 22 located between the light-absorbing layer 3 and the active layer 4. The reflecting polarization layer 22 is transparent to light 5 having a first direction of polarization and reflective to light 6 having a second direction of polarization. Light 5 such as, for example, ambient light, will therefore pass through the active layer 4 and the layer 22 and will subsequently be absorbed by the absorbing layer 3.

Light 6 coming from the projector 7 and having a second direction of polarization is scattered by the active layer 4 so that a portion of the light is scattered in a direction remote from the absorbing layer 3 and a portion is scattered into the direction of the absorbing layer 3. The latter portion is reflected by the reflecting layer 22 towards the active layer 4 where it is scattered again into light reflecting back to the reflecting layer 22 and into light scattered in a direction remote from the absorbing layer 3. In this way, the light denoted by arrow 9 in FIG. 2 will be completely reflected in a direction denoted by arrow 23. Scattering light spots 24, 25, 26 then occur.

Figure 5:
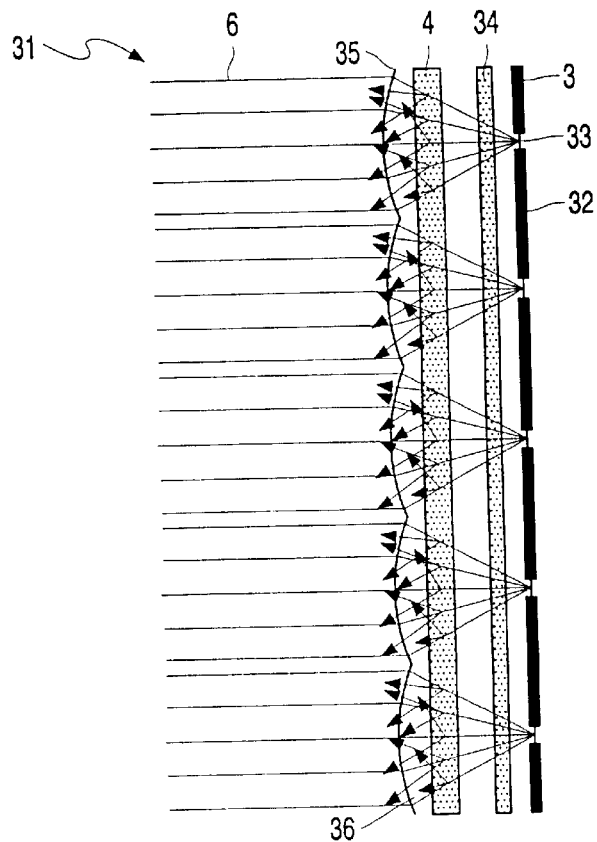

FIG. 5 shows an embodiment of a projection screen 31 according to the invention, provided with a light-absorbing layer 3 having relatively large light-absorbing portions 32 which are separated from each other by relatively small light-reflecting, mirror portions 33. A ¼λ layer 34, an active layer 4 and a lens layer 35 are consecutively located in front of the absorbing layer 3. The lens layer 35 comprises lenses 36 whose optical axes pass through the center of the associated reflecting portion 33.

The projection screen 31 operates as follows. Light 6 coming from a projector and having a second direction of polarization is focused by the lenses 35, which preferably have a double refractive index, by the active layer 4 and by the ¼λ foil on the mirror portions 33. Due to the double refractive index, light having the second direction of polarization is better focused on the mirror portions 33 than light having the first (unwanted) direction of polarization. The incident light passes through the active layer 4 and is subsequently converted by the ¼λ foil into circularly polarized light and its direction of rotation is changed after reflection on the reflecting portions 33. The reflected light again passes through the ¼λ foil and is subsequently incident as linearly polarized light having a different direction of polarization than the incident light on the active layer 4 where this light is scattered.

Figure 6:
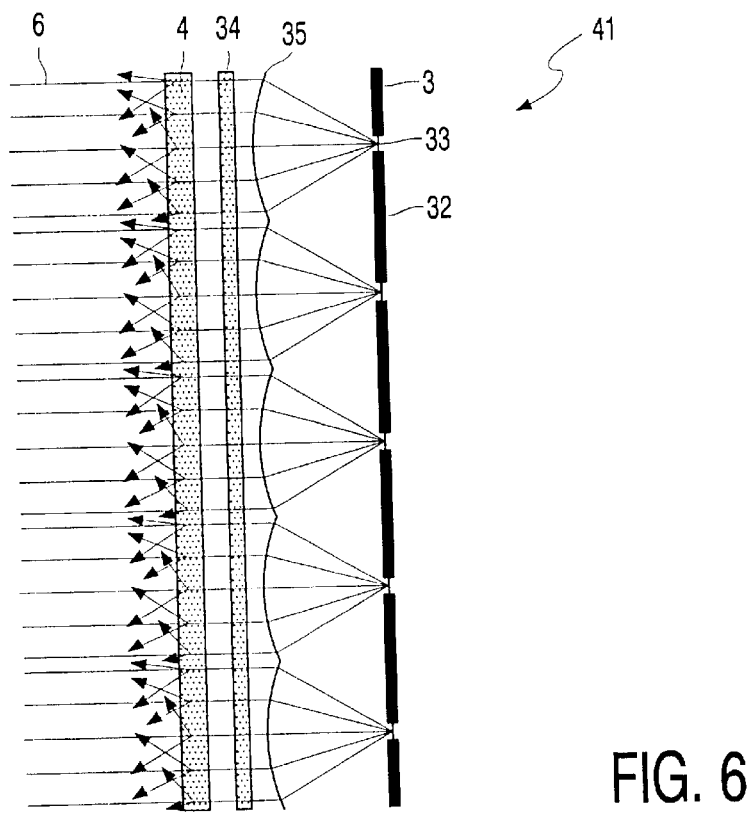

FIG. 6 shows an embodiment of a projection screen 41 according to the invention, which differs from the projection screen 31 in that the lens layer 35 is not located in front of the active layer 4 but between the ¼λ foil 34 and the absorbing layer 3.

Figure 7:
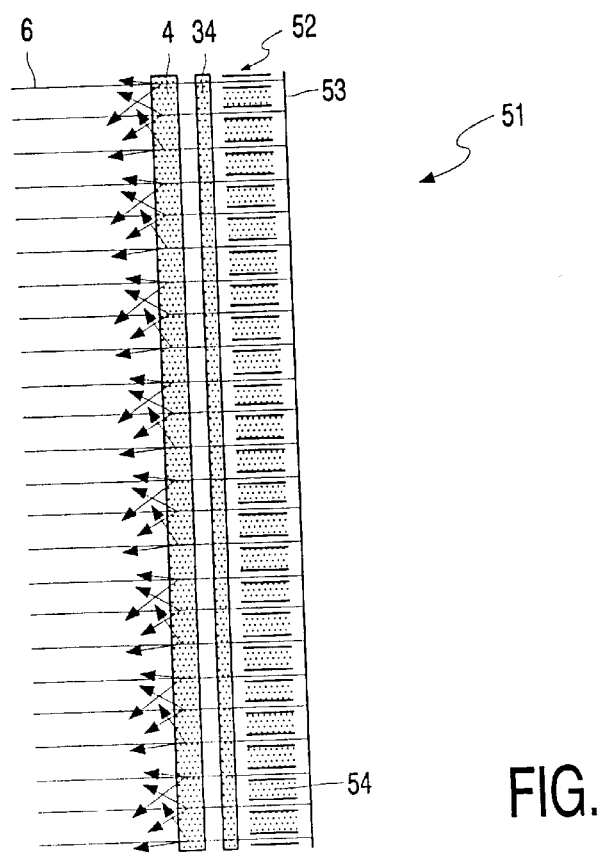

FIG. 7 shows an embodiment of a projection screen 51 according to the invention, provided with a light-absorbing layer 52 having a reflecting layer 53 on which a louvre foil 54 is provided. A ¼λ foil 34 and an active layer 4 are located in front of the light-absorbing layer 52.

Polarized light 6 passes through the active layer 4, the ¼λ foil 34, the louvre foil 54 and is mirrored by the mirror surface 53. On its way back, its direction of polarization is reversed and it is subsequently scattered by the active layer 4. Ambient light having an angle of incidence which differs from 90° is absorbed by the louvre foil 54.

Figure 8:
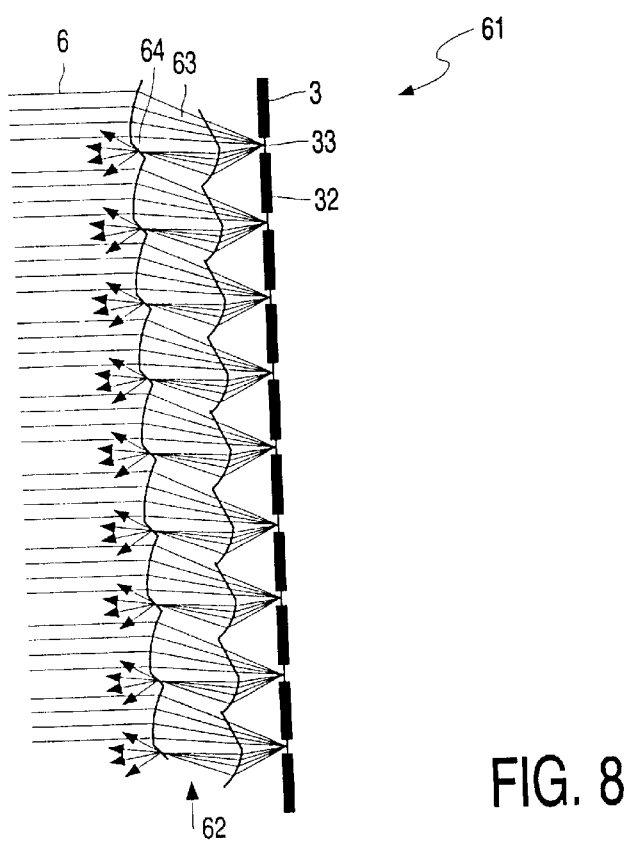

FIG. 8 shows an embodiment of a projection screen 61 according to the invention, provided with a light-absorbing layer 3 comprising relatively large light-absorbing portions 32 which are separated from each other by relatively small light-reflecting, mirror portions 33. A lens layer 62 comprising lenses 63 is located in front of the absorbing layer 3. Each lens 63 is configured in such a way that light 6 from a projector is projected on the relatively small light-reflecting mirror portions 33 and subsequently reflected by these portions 33 towards a front portion 64 of the lens element 63. The front portion 64 is provided with an active layer which scatters the reflected light.

The mirror portions 33 in the projection screen may of course be positioned with respect to the associated lens elements 63 in such a way that the light from the projection lens is accurately focused on these mirror portions 33. In practice, the light will not always be perpendicularly incident on the projection screen.

What is claimed is:

1. A projection screen having a light-absorbing layer and an active layer located in front of the light-absorbing layer, which active layer is transparent to light having a first direction of polarization and scatters light having a second direction of polarization, characterized in that a reflective polarizing layer is located between the light absorbing layer and the active layer, which reflective polarizing layer is transparent to light having the first direction of polarization and reflective to light having the second direction of polarization.

2. A projection screen as claimed in claim 1, characterized in that a micro-lens layer is located on a side of the active layer remote from the light-absorbing layer, the active layer having active portions separated from each other by light-transmitting portions, which active portions are transparent to light having a first direction of polarization and scatter light having a second direction of polarization.

3. A projection screen as claimed in claim 1, characterized in that the light-absorbing layer is provided with relatively small light reflecting faces, the projection screen being further provided with a lens layer comprising a plurality of lenses located opposite said faces.

4. A projection screen as claimed in claim 3, characterized in that the lens layer is located between the polarization-reversing layer and the light-absorbing layer.

5. A projection screen as claimed in claim 3, characterized in that the lens layer is located on a side of the active layer remote from the light-absorbing layer.

6. A projection screen as claimed in claim 1, characterized in that a polarization-reversing layer is located between the active layer and the light-absorbing layer.

7. A projection screen as claimed in claim 6, characterized in that the polarization-reversing layer is a ¼λ foil.

8. A projection screen as claimed in claim 1, characterized in that the light-absorbing layer comprises a louvre foil.

\* \* \* \* \*